United States Patent
Brown et al.

(10) Patent No.: US 7,092,508 B2
(45) Date of Patent: Aug. 15, 2006

(54) RATING PARTIES ACCORDING TO PARTY IDENTITIES

(75) Inventors: Michael Wayne Brown, Georgetown, TX (US); Joseph Herbert McIntyre, Austin, TX (US); Michael A. Paolini, Austin, TX (US); James Mark Weaver, Austin, TX (US); Scott Lee Winters, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 768 days.

(21) Appl. No.: 10/081,014

(22) Filed: Feb. 21, 2002

(65) Prior Publication Data

US 2003/0156707 A1 Aug. 21, 2003

(51) Int. Cl.
*H04M 3/00* (2006.01)
*H04M 5/00* (2006.01)
*H04M 1/64* (2006.01)

(52) U.S. Cl. .............................. 379/265.06; 379/88.02

(58) Field of Classification Search ..............................
379/265.01–266.1, 88.01, 88.02, 309; 370/352;
704/273; 707/10, 205; 713/155
See application file for complete search history.

(56) References Cited

U.S. PATENT DOCUMENTS

| | | | |
|---|---|---|---|
| 4,278,844 A | 7/1981 | Jones | |
| 5,181,238 A | 1/1993 | Medamana et al. | |
| 5,499,288 A | 3/1996 | Hunt et al. | 379/88 |
| 5,566,229 A | 10/1996 | Hou et al. | 379/88 |
| 5,651,055 A | 7/1997 | Argade | |
| 5,673,404 A | 9/1997 | Cousins et al. | 395/347 |
| 5,724,408 A | 3/1998 | Morganstein | 379/88.2 |
| 5,757,899 A | 5/1998 | Boulware et al. | |
| 5,790,637 A | 8/1998 | Johnson et al. | 379/67 |
| 5,884,032 A | 3/1999 | Bateman et al. | |
| 5,915,001 A | 6/1999 | Uppaluru | 379/88.22 |
| 5,937,044 A | 8/1999 | Kim | |
| 5,940,476 A | 8/1999 | Morganstein et al. | 379/88.02 |
| 5,946,386 A | 8/1999 | Rogers et al. | |
| 5,946,654 A | 8/1999 | Newman et al. | 704/246 |
| 5,978,467 A | 11/1999 | Walker et al. | 379/266.01 |
| 6,038,305 A | 3/2000 | McAllister et al. | 379/207 |
| 6,049,599 A * | 4/2000 | McCausland et al. | 379/111 |
| 6,058,364 A | 5/2000 | Goldberg et al. | 704/252 |
| 6,101,242 A | 8/2000 | McAllister et al. | 379/88.02 |
| 6,115,613 A | 9/2000 | Jonsson | |
| 6,122,357 A | 9/2000 | Farris et al. | 379/207 |
| 6,160,877 A | 12/2000 | Tatchell et al. | |
| 6,178,230 B1 | 1/2001 | Borland | 379/67.1 |
| 6,178,240 B1 | 1/2001 | Walker et al. | 379/266.01 |
| 6,263,071 B1 | 7/2001 | Swan et al. | |

(Continued)

FOREIGN PATENT DOCUMENTS

EP 0585004 A2 3/1994

(Continued)

*Primary Examiner*—Benny Quoc Tieu
(74) *Attorney, Agent, or Firm*—Mark S. Walker; Amy J. Pattillo

(57) ABSTRACT

A method, system, and program for rating parties according to party identities are provided. A second party to a call may rate the first party to the call. For subsequent calls by the first party, the rating by the second party of the first party may be displayed to subsequent called parties. In addition, the ratings by subsequent called parties may be accumulated for the first party. Ratings may be stored according to the identity of the individual representing the first party, according to the identity of the business representing the first party, or according to the context of a call.

35 Claims, 9 Drawing Sheets

U.S. PATENT DOCUMENTS

| | | | |
|---|---|---|---|
| 6,327,346 B1 | 12/2001 | Infosino | 379/88.02 |
| 6,359,971 B1 | 3/2002 | Haimi-Cohen et al. | 379/88.01 |
| 6,587,556 B1 * | 7/2003 | Judkins et al. | 379/219 |
| 6,650,736 B1 * | 11/2003 | Unger et al. | 379/88.02 |
| 6,665,723 B1 | 12/2003 | Trossen | |
| 6,671,672 B1 | 12/2003 | Heck | |
| 6,724,866 B1 | 4/2004 | Kuhn et al. | 379/88.21 |
| 6,798,876 B1 * | 9/2004 | Bala | 379/265.12 |
| 6,826,173 B1 | 11/2004 | Kung et al. | |
| 2002/0080950 A1 * | 6/2002 | Koko et al. | 379/265.06 |
| 2002/0085698 A1 | 7/2002 | Liebenow | |
| 2002/0154752 A1 | 10/2002 | Carpenter | |
| 2003/0156695 A1 | 8/2003 | Brown et al. | 379/188 |
| 2003/0156696 A1 | 8/2003 | Brown et al. | 379/196 |
| 2003/0169856 A1 * | 9/2003 | Elazar et al. | 379/67.1 |

FOREIGN PATENT DOCUMENTS

| | | |
|---|---|---|
| EP | 0676882 A2 | 10/1995 |
| JP | 8139797 A | 5/1996 |
| JP | 10294784 A | 11/1998 |

\* cited by examiner

RATING PARTIES ACCORDING TO PARTY IDENTITIES

CROSS-REFERENCE TO RELATED APPLICATIONS

The present application is related to the following copending applications:

(1) U.S. patent application Ser. No. 10/081,029, titled "Third Party Regulation of Calls Through a Particular Line Based on a Call Context"; and (2) U.S. Patent No. 6,917,672, issued Jul. 12, 2005, titled "Third Party Regulation of Calls Based on the Caller and Callee Pair to a Call".

BACKGROUND OF THE INVENTION

1. Technical Field

The present invention relates in general to telecommunications and, in particular, to call party identification. Still more particularly, the present invention relates to rating calling parties according to party identifiers.

2. Description of the Related Art

Telephone service has created communication channels worldwide, and those channels continue to expand with the advent of cellular and other wireless services. A person can simply take a telephone off-hook and dial a destination number or press a send button and be connected to a telephone line around the world.

Telephone communication channels are often utilized as a resource for selling products and services. For example, a sales person may call a list of potential purchasers with a product offer. In another example, an individual may call a business and reach a sales associate.

Use of telephone lines originated by a business for sales purposes is often referred to as telemarketing. Many telephone subscribers find telemarketing calls to be an annoyance and find ways to screen calls and avoid telemarketers. For example, telephone subscribers may subscribe to a caller ID service providing for the display of the line number from which a call is placed. However, a limitation of caller ID is that the identity of the actual caller is not provided and telemarketing business may block the line number ID from display.

A further limitation of telemarketing and phone sales is the identity of the telemarketer is not verifiable. Further, the expertise and sales ability of the sales person are not provided to the potential customer.

Therefore, in view of the foregoing, it would be advantageous to provide a method, system, and program for rating parties to a call according to each party's identity. In particular, it would be advantageous to provide telemarketer ratings to a potential customer with the telemarketer identity. Further, it would be advantageous to allow each potential customer contacted by a telemarketer to rate the telemarketer and the business, whether the ratings are provided to future potential customers.

SUMMARY OF THE INVENTION

In view of the foregoing, it is therefore an object of the present invention to provide an improved telecommunications system.

It is another object of the present invention to provide a method, system and program for improved call party identification.

It is yet another object of the present invention to provide a method, system and program for rating calling parties according to party identifiers.

According to one aspect of the present invention, an identity of a first party to a call is detected. A second party to said call is requested to rate the first party to the call. The rating by the second party is stored in association with the identity of the first party to the call.

According to another aspect of the present invention, an identity of a first party to a call is detected. A current rating for the first party is compiled according to previous ratings for the first party. Output of the current rating to a second party to the call is controlled. Previous ratings for the first party may be compiled from ratings by the second party, ratings by other parties called by the first party, and ratings by third party rating services.

All objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
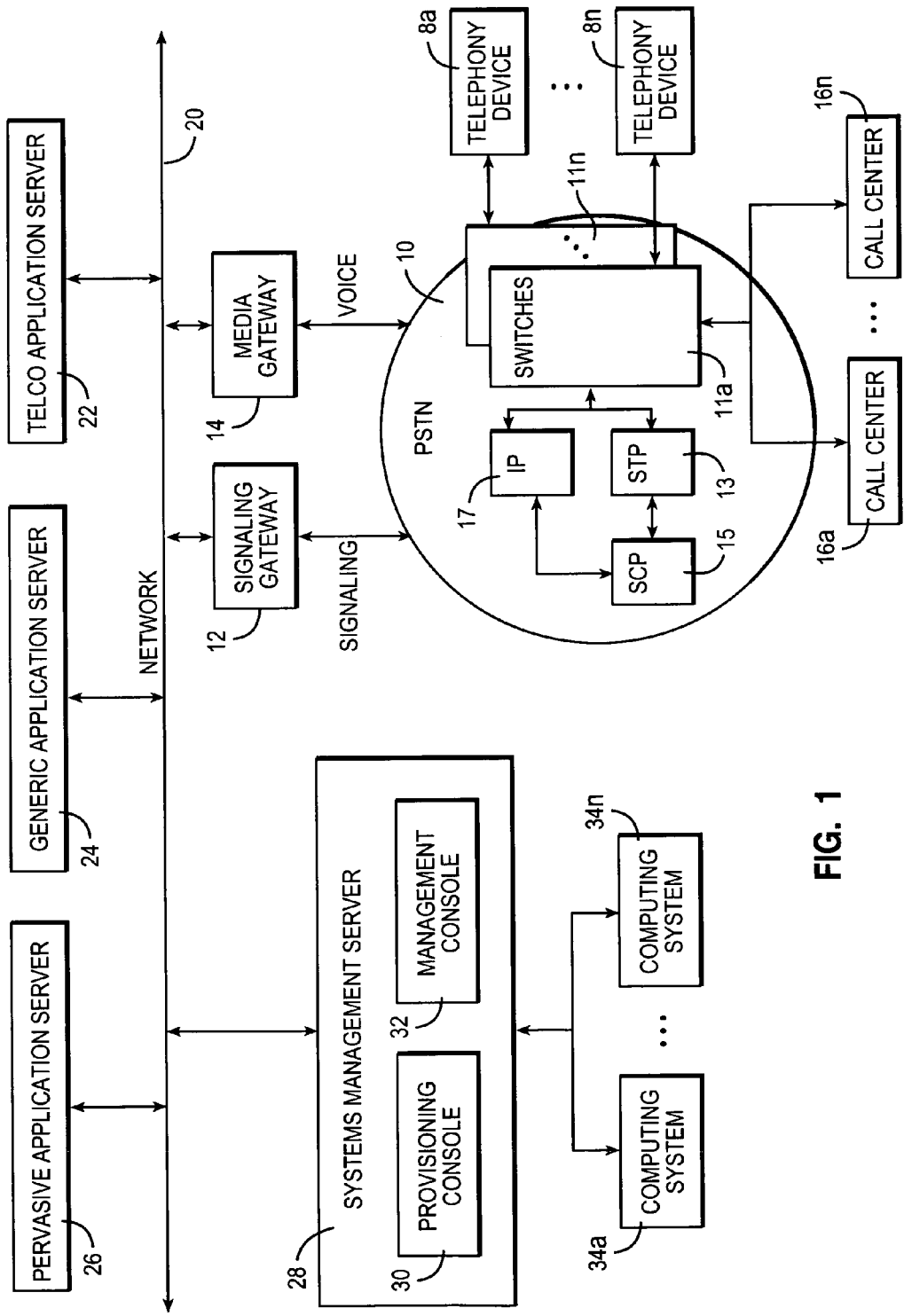
FIG. 1 depicts a block diagram of a network environment in which the present invention may be implemented.

A method, system, and program for rating a party to a call are provided. The party rating is preferably determined from the context of a call and provided to another party to a call.

For purposes of the present invention, context may include, but is not limited to, the identity of the caller or callee, the device identity and owner, the location of the caller and callee, the path of a call, and billing information for the caller and callee. Location of the caller and callee may include, but is not limited to, the time zone, country, state, city, building location, or GPS location of a caller or callee. As a call is transferred and forwarded, context clues for each portion of a call path are gathered and utilized to update the context of the call.

Determination of context and ratings are preferably performed by a context inference service and a context rating service located within an Intelligent Peripheral of the trusted telephone network and/or located within a telecommunications (Telco) Application service outside the trusted telephone network. As will be further described, the Telco application service located outside the trusted telephone network is enabled to provide services to callers and callers via enhanced security channels.

Identity authentication is preferably performed by authenticating the voices of the caller and callee, however other biometric input may also be utilized for identification. Identity authentication may be initiated by the origin device originating the call, the intermediary device processing the call, or the destination device receiving the call. Each of the devices may access a third party or external server to perform the identity authentication. Performance of identity authentication has different advantages depending on the device initiating the identity authentication.

While as described, authentication of a caller or callee identity is described with emphasis placed on voice authentication, other methods of caller and callee identity authentication may also be performed. Voice samples utilized for voice authentication are just one of multiple types of biometric sampling. For example, a caller or callee may locally provide an eye scan, a fingerprint, and other biophysical identifiers that are transmitted within or outside the trusted network to authenticate the identity of the caller or callee.

Before, during, and/or after a call, each party to a call may rate the other party to the call. Ratings may include, but are not limited to, a numerical scale, a positive/negative scale, and other scaling. Multiple categories may be rated for a party to a call. In addition, textual and voice comments may be provided.

Ratings may be stored according to the caller, according to the callee, according to the call context, or according to other criteria. A rating by a caller of a callee may be accumulated with other ratings for the callee and/or individually stored in association with the caller for future retrieval. A group of individuals may share ratings and/or an individual may subscribe to a particular rating service that accumulates ratings made by users of that service.

For purposes of the present invention, telephony devices are termed origin devices when utilized for origination of a call to an intermediary device and are termed destination devices when utilized for receipt of a call from an intermediary device. Subscribers to a call are termed callers when originating a call and are termed callees when receiving a call. Callers and callees may or may not be line subscribers to the particular telephony device utilized.

In addition, for purposes of the present invention, a trusted telephone network preferably includes a traditional trusted telephone network, however also includes, but is not limited to, an Internet Protocol telephony network, a digital telephone network, and other communication networks.

In the following description, for the purposes of explanation, numerous specific details are set forth to provide a thorough understanding of the present invention. It will be apparent, however, to one skilled in the art that the present invention may be practiced without these specific details. In other instances, well-known structures and devices are shown in block diagram form to avoid unnecessarily obscuring the present invention.

With reference now to the figures, and, in particular, with reference now to FIG. 1, there is depicted a block diagram of a network environment in which the present invention may be implemented. While the present invention is described with reference to one type of network environment, it will be understood by one with skill in the art that the present invention may be implemented in alternate types of network environments.

First, the network environment incorporates a Public Switching Telephone Network (PSTN) 10. As is known in the art the core of PSTN 10 may include multiple telephone networks, each owned by one of multiple independent service providers. Each telephone line is carried by an independent service provider within PSTN 10 and is typically assigned to at least one subscriber.

Switching of a call within an independent service provider's telephone network is considered trusted movement within a trusted network because the call remains within the company's telephone network infrastructure. However, calls may be transferred from one service provider's telephone network to another service provider's telephone network in generally trusted movement. Generally, service providers are in competition with one another and therefore there is general trust in transferring a call, but not trust in sharing of subscriber information beyond a subscriber number and name from one service provider to the next without security features or other arrangements.

Advantageously, each telephone network within PSTN 10 may access a data network functioning as an extension to PSTN 10 via an Intranet. Data networks may include, for example, subscriber profiles, billing information, and preferences that are utilized by a service provider to specialize services. Transfer of information between a service provider's data network and telephone network is trusted movement in sharing of information.

Further, each telephone network within PSTN 10 may access server systems external to PSTN 10 in the Internet Protocol over the Internet or an Intranet. Such external server systems may include an enterprise server, an Internet service provider (ISP), an access service provider (ASP), a personal computer, and other computing systems that are accessible via a network. In the present embodiment, transfer of information between PSTN 10 and server systems accessible via a network 20 is untrusted and therefore may require verification and additional security. Network 20 may be preferably considered an external network.

In the present invention, network 20 may comprise a private network, an Intranet, or a public Internet Protocol network. Specifically, telco application server 22, generic application server 24, pervasive application server 26, and systems management server 28 represent server systems external to PSTN 10 that may be accessed by PSTN 10 over network 20.

In particular, telco application server 22 preferably includes multiple telco specific service applications for providing services to calls transferred to a server external to PSTN 10. In particular, a call may be transferred from PSTN 10 to telco application server 22 to receive at least one service and then the call is transferred back to PSTN 10. PSTN 10 preferably brokers the connection between the telephony device and telco application server 22. Such services may also be provided to calls within PSTN 10, however placing such services at a third party such as telco application server 22, is advantageous because adding services and information to PSTN 10 is time consuming and costly when compared with the time and cost of adding the services through telco application server 22.

Advantageously, as will be further described, the identity of both the caller and the callee may be authenticated by one of telephony devices 8a–8n, PSTN 10, or by telco application server 22. By authenticating the actual identity of the person making a phone call and the person receiving the phone call, rather than the identification of a device from which a call is made and received, an enhanced specialization of services to subscribers may be performed.

An authentication service within telco application server 22 may include identification and verification of the identity of a caller and/or callee of a particular call. Such a service may require that subscribers provide voice samples when setting up a subscription. The stored voice samples may then be compared against voice samples received for a particular call in order to authenticate the identity of a current caller or callee of the particular call.

Generic application server 24 preferably accesses independent server systems that provide services. For example, a messaging server, a financial server, an Internal Revenue Service (IRS) server, and database management system (DBMS) server may be accessed in HTTP via network 20. Each of these servers may include a telco service application that requires authentication of the subscriber before access is granted. For example, a financial server may provide a telco service application that allows an authenticated subscriber to access current financial records and request stock quotes from the financial server.

Pervasive application server 26 manages services for wirelessly networked devices. In particular, pervasive application server 26 preferably handles distribution of wireless packets of voice and data to wirelessly networked devices utilizing a standard such as short messaging service (SMS) messaging or other 3G standards.

Systems management server 28 manages subscriber personalization via the web. In particular, systems management server 28 includes browser technology that includes a provisioning console 30 for establishing a subscriber profile and a management console 32 for managing and updating the subscriber profile. A subscriber preferably accesses the consoles of systems management server 28 via the Internet utilizing a computing system, such as computing systems 34a–34n.

The subscriber profile may be accessed at systems management server 28 by other external servers and PSTN 10 via network 20. In addition, a local copy of a subscriber profile updated in systems management server 28 may be stored within a particular service provider's data network or telephone network. Each service provider may specify the types of preferences and other information included within a subscriber profile.

In particular, a subscriber may provide a voice imprint when establishing a subscriber profile through provisioning console 30. Other types of authentication information may also be provided including, but not limited to, a password, an eye scan, a smart card ID, and other security devices. In addition, a subscriber may designate billing preferences, shopping preferences, buddy list preferences, and other preferences that enable specialized service to the subscriber when the subscriber's identity is authenticated from the voice imprint or other identification.

Advantageously, a management agent is built into each external server to monitor the services provided by each server according to the authenticated subscriber receiving the services. By monitoring service output according to subscriber, the subscriber may then be billed according to each use of a service.

PSTN 10 preferably includes both voice and data signaling networks that interface with network 20 via gateways. Each of the gateways acts as a switch between PSTN 10 and network 20 that may compress a signal, convert the signal into Internet Protocol (other protocol) packets, and route the packets through network 20 to the appropriate server.

In particular, the voice network interfaces with network 20 through media gateway 14 which supports multiple protocol gateways including, but not limited to, SIP. SIP is a signaling protocol for Internet conferencing, telephony, presence, events notification and instant messaging.

In addition, in particular, the data signaling network interfaces with network 20 through signaling gateway 12 which supports multiple protocol gateways including, but not limited to, parlay protocol gateways and SS7 protocol gateways. Internet servers, such as telco application server 22 may include protocol agents that are enabled to interact with multiple protocols encapsulated in Internet Protocol packets including, but not limited to, SS7 protocol, parlay protocol, and SIP.

Looking into PSTN 10, a telephone network typically includes multiple switches, such as central office switches 11a–11n, that originate, terminate, or tandem calls. Central office switches 11a–11n utilize voice trunks for transferring voice communications and signaling links for transferring signals between signaling points.

Between signaling points, one central office switch sends signaling messages to other central office switches via signaling links to setup, manage, and release voice circuits required to complete a call. In addition, between signaling points, central office switches 11a–11n query service control points (SCPs) 15 to determine how to route a call. SCPs 15 send a response to the originating central office switch containing the routing number(s) associated with the dialed number.

SCPs 15 may be general purpose computers storing databases of call processing information. While in the present embodiment SCPs 15 are depicted locally within PSTN 10, in alternate embodiments SCPs 15 may be part of an extended network accessible to PSTN 10 via a network.

One of the functions performed by SCPs 15 is processing calls to and from various subscribers. For example, an SCP may store a record of the services purchased by a subscriber, such as a privacy service. When a call is made to the subscriber, the SCP provides record of the privacy service to initiate an announcement to a caller to identify themself to the subscriber with the privacy service who is being called. Advantageously, authentication of the subscriber receiving the call may be required before the privacy service is initiated for that subscriber.

In particular, network traffic between signaling points may be routed via a packet switch called an service transfer point (STP) 13. STP 13 routes each incoming message to an outgoing signaling link based on routing information. Further, in particular, the signaling network may utilize an SS7 network implementing SS7 protocol.

Central office switches 11a–11n may also send voice and signaling messages to intelligent peripherals (IP) 17 via voice trunks and signaling channels. IP 17 provides enhanced announcements, enhanced digit collection, and enhanced speech recognition capabilities.

Advantageously, the identity of a caller is authenticated according to voice authentication. Voice authentication is preferably performed by first identifying a subscriber by matching the name or other identifier spoken with a subscriber name or identifier. Next, voice authentication requires verifying that the voice audio signal matches that of the identified subscriber. However, in alternate embodiments, the identity of a caller may be authenticated according to passwords, eye scans, encryption, and other security devices.

In particular, to perform subscriber authentication of audio signals received from callers, IP 17 may include storage for subscriber specific templates or voice feature information, for use in authenticating subscribers based on speech. If a subscriber specific template is not stored on a local IP 17, then a remote IP containing the subscriber specific template may be accessed via a network. In addition, local IP 17 may access systems management server 28 or another repository for voice imprints to access the subscriber specific template.

Where IP 17 authenticates the identity of a caller (e.g. the subscriber placing a call), a voice identifier (VID) representing the authenticated caller identity is transferred as a signal for identifying the caller. In addition, where IP 17 authenticates the identity of a callee (e.g. the subscriber receiving a call), a reverse VID (RVID) including the callee identity is transferred as a signal for identifying the callee.

Alternatively, to perform subscriber authentication of audio signals received from callers, PSTN 10 may broker a caller identity authentication service from telco application server 22. In particular, a signaling channel is opened between central office switches 11a–11n and telco application server 22 via signaling gateway 12. In addition, a voice channel is opened between central office switches 11a–11n and telco application server 22 via media gateway 14.

Because telco application server 22 is located outside of the trusted network, there may be a time delay associated with establishing a connection to telco application server 22 and authenticating the identity of a caller that is longer than a time delay present where a caller identity is authenticated by IP 17.

In addition, because telco application server 22 is located outside of the trusted network, it is advantageous to establish a level of security for transactions between telco application server 22 and central office switches 11a–11n wherein the level of security is suitable for untrusted communications. A level of security may be implemented by utilizing security based protocols, such as the secure socket layer, and by applying ordinary encryption. In particular, the level of security preferably protects the communication channel between telco application server and PSTN 10 and authenticates the identity of the server from which a caller identity authentication service is accessed. Therefore an additional feature of signaling gateway 12 and media gateway 14 is security verification.

Advantageously, VIDs indicate through text, voice, or video the identity of a caller. For example, a caller's name may be transferred as the identity of a caller. Alternatively, a video clip stored with the subscriber template may be transferred as the identity of a caller. Additionally, VIDs may indicate the identity of the device utilized by a caller to provide context for a call. For purposes of the present invention, the business that the caller is calling on behalf of is also indicated in the VID. Further, VIDs may indicate which system or systems have authenticated the caller identity.

After a VID and/or RVID are determined by IP 17, IP 17 and SCP 15 may communicate to designate which services are available according to VID and RVID. Advantageously, by designating services according to a VID and/or RVID, subscribers are provided with services and billed for those services independent of the devices utilized by subscribers. In particular, a 1129 protocol or other protocol may be utilized to enable signal communications between IP 17 and SCPs 15.

In addition, as previously described, caller authentication to determine VIDs and RVIDs may be performed by an external system, such as telco application server 22. The VID or RVID returned from telco application server 22 may be transferred from central office switches 11a–11n to SCP 15 in order to access a subscriber profile associated with the VID or RVID. Alternatively, the VID or RVID may first transfer to IP 17, where additional verification of the caller identity is performed. For example, IP 17 may control distribution of the VID to the caller, where the caller is prompted to enter a password or additional information. IP 17 may then initiate loading the caller profile into central office switches 11a–11n if the additional caller input is verifiable for the VID.

An origin telephony device or destination telephony device may also determine a VID and/or RVID for the caller and/or callee of a call. In particular, telephony devices 8a–8n and call centers 16a–16n may function as origin and destination telephony devices. Each of the telephony devices may include a database of voice templates that may be matched to authenticate the identity of a caller or callee. In addition, each of the telephony devices may access a third party, such as telco application server 22, to authenticate the identity of the caller or callee. In either case, the telephony device transmits a VID and/or RVID with a call to PSTN 10.

Telephony devices 8a–8n may include, but are not limited to wireline devices, wireless devices, pervasive device equipped with telephony features, a network computer, a facsimile, a modem, and other devices enabled for network communication. Advantageously, as previously described, a voice authentication functioning device may be included in each of telephony devices 8a–8n.

In addition, telephony devices 8a–8n may each incorporate a display that provides a visual output of a VID or RVID. Alternatively, such a display may be provided in a separate device connected to the line in parallel to telephones 8a–8n. Advantageously, the identity of the actual caller or actual callee is output to a display in association with a call. In addition, other context information about the caller including, but not limited to, the device from which the call originates or is answered, ratings for a caller or callee, and other context information may be output to a display in association with a call. In particular, where output of the identity of the actual caller or actual callee is blocked, display of other context information may not be blocked, such that context for the call may be provided without revealing the actual identity of the caller or callee.

Telephony devices 8a–8n are communicatively connected to PSTN 10 via wireline, wireless, ISDN, and other communication links. Preferably, connections to telephony devices 8a–8n provide digital transport for two-way voice grade type telephone communications and a channel transporting signaling data messages in both directions between telephony devices 8a–8n and PSTN 10.

In addition to telephony devices 8a–8n, advanced telephone systems, such as call centers 16a–16n, may be communicatively connected to PSTN 10 via wireline, wireless, ISDN and other communication links. Call centers 16a–16n may include PBX systems, hold queue systems, private network systems, and other systems that are implemented to handle distribution of calls to multiple representatives or agents.

Returning to central office switches 11a–11n, typically, one central office switch exists for each exchange or area served by the NXX digits of an NXX-XXXX (seven digit) telephone number or the three digits following the area code digits (NPA) in a ten-digit telephone number. The service provider owning a central office switch also assigns a telephone number to each line connected to each of central office switches 11a–11n. The assigned telephone number includes the area code (NPA) and exchange code (NXX) for the serving central office and four unique digits (XXXX).

Central office switches 11a–11n utilize office equipment (OE) numbers to identify specific equipment, such as physical links or circuit connections. For example, a subscriber's line might terminate on a pair of terminals on the main distribution frame of one of central office switches 11a–11n The switch identifies the terminals, and therefore a particular line, by an OE number assigned to that terminal pair. For a variety of reasons, a service provider may assign different telephone numbers to the one line at the same or different times. For example, a local carrier may change the telephone number because a subscriber sells a house and a new subscriber moves in and receives a new number. However, the OE number for the terminals and thus the line itself remains the same.

On a normal call, a central office switch will detect an off-hook condition on a line and provide a dial tone. The switch identifies the line by the OE number. The central office switch retrieves profile information corresponding to the OE number and off-hook line. Then, the central office switch receives the dialed digits from the off-hook line terminal and routes the call. The central office switch may route the call over trunks and possibly through one or more central office switches to the central office switch that serves the called party's station or line. The switch terminating a call to a destination will also utilize profile information relating to the destination, for example to transfer the call if appropriate, to apply distinctive ringing, etc.

Authentication of the identity of the caller is preferably initiated in IP 17 or telco application server 22. Once a VID for a caller is received at a central office switch, a context inference application is initiated in IP 17 or telco application server 22. The context inference service preferably requests a caller profile according to VID to determine billing information and personal information about the caller. In addition, the context inference service preferably determines the identity of the device utilized by accessing a device directory, prompting the caller to indicate the device identity, or other methods. Further, the location of the device may be inferred from information provided by the central office switch originating the call, a GPS location, and the location assigned to a line number. Other context information, such as the subject matter of a call and the role in which a caller is placing the call, are preferably determined as well. The context information is preferably loaded with the VID at the central office switch.

The context information may be filtered at the central office switch according to general filtering preferences indicated by a caller in the caller profile. In addition, context information may be filtered according to caller filtering preferences specifically selected for the callee. Context information is then transferred with the call routed by one or more central office switches to a destination central office switch that services the called party's station or line.

Then, the context information is forwarded with a caller VID to the callee device. The callee is enabled to determine whether to answer a call, transfer the call to voice mail, or select from other call handling options, based on knowing the identity of the caller and the context of the call.

In particular, the caller may provide the line number requested and/or may enter an identifier for the intended callee. A search engine may be accessed within IP 17 or telco application server 22 that queries at least one device associated with a callee to attempt to locate the intended callee. A callee profile accessible according to the intended callee identity may include line number subscriptions and recently used line numbers, such that the search engine may query those line numbers to locate the intended callee.

In addition, authentication of the identity of a callee answering the call is preferably initiated in IP 17 or telco application server 22. Once a RVID for a callee is received at a central office switch, a context inference application is initiated in IP 17 or telco application server 22 to determine the context of the callee side of a call. The callee context information is preferably filtered according to callee preferences and transferred to the caller, such that the caller is provided with an identity of the callee.

As a call is forwarded or transferred to other callers and callees, IP 17 or telco application server 22 are preferably initiated to update the context for a call. For example, the context may indicate the path of line number accessed in a call and whether the call was transferred or forwarded.

According to a further advantage, a context rating service located within IP 17 or telco application server 22 preferably determines a current rating for each caller and each callee from previous ratings according to the context of the call. In addition, the context rating service preferably controls entry of ratings by the each caller and each callee for a current call.

Figure 2:
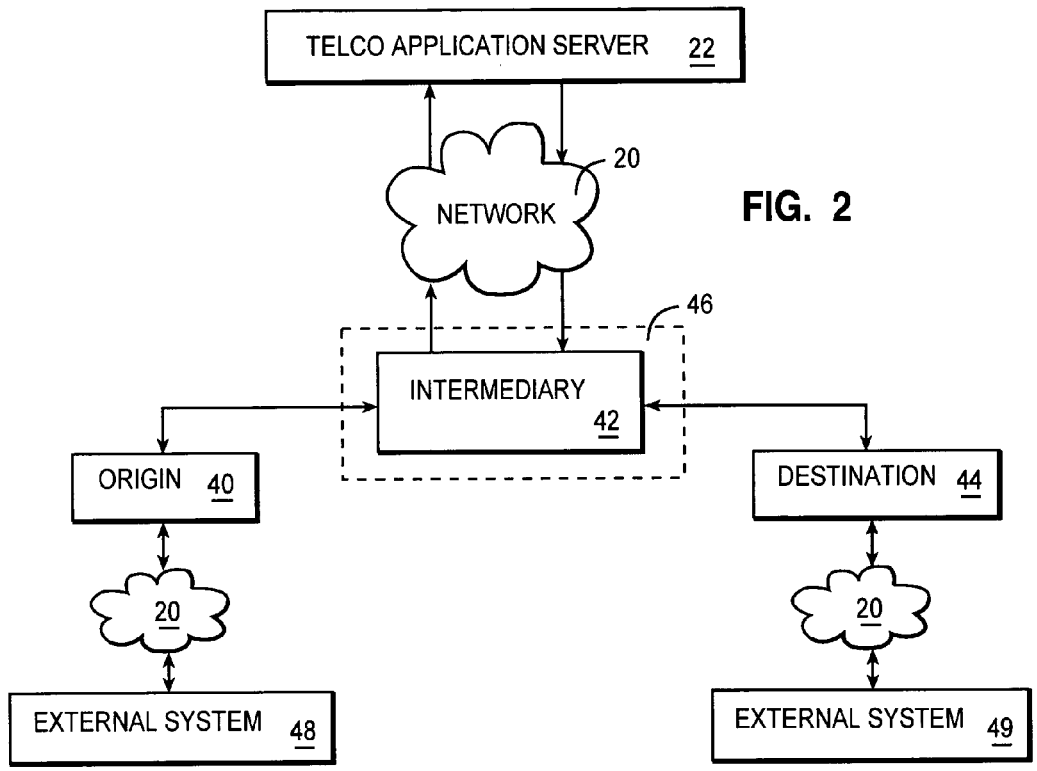
FIG. 2 illustrates a block diagram of an identification system in accordance with the method, system, and program of the present invention.

Referring now to FIG. 2, there is illustrated a block diagram of an identification system in accordance with the method, system, and program of the present invention.

Origin device 40 is utilized by a caller to initiate a call. The caller is prompted by the device performing caller authentication to provide a voice utterance. A VID for the caller is provided to intermediary device 42 from the device performing caller authentication. The VID is utilized to access a caller profile that includes service preferences and billing information. In addition, the VID is transmitted with the call to destination device 44 for identifying the caller.

In general, caller identity authentication is performed by receiving a voice utterance from a caller, analyzing the voice utterance for sound qualities and content, and attempting to match the sound qualities and content of a voice utterance to a voice template previously recorded for a caller, to authenticate the identity of the caller. If there is a match between the voice utterance and a voice template, then a VID is determined for the caller and utilized to authenticate the caller identity for retrieving a caller profile and billing the caller. However, in alternate embodiments, the identity of a caller may be authenticated according to passwords, eye scans, encryption, and other biometric methods.

Caller identity authentication may be initiated by origin device 40. In particular, origin device 40 may include voice templates and a feature for performing the caller identity authentication. In addition, origin device 40 may access a third party server 48 via network 20, where third party server 48 may provide access to a database of voice templates and/or perform the caller identity authentication. Origin device 40 then transmits a VID determined for the caller to intermediary device 42 for use in specifying services and billing for a call from origin device 40. Origin device 40 may include a caller telephony device, a PBX, a call center, a private switching system, network servers, feature servers, and other systems which provide call origination. Third party server 48 may include a telco application server, a generic application server, a database management system server, and other systems that function outside trusted telephone network 46. In particular, intermediary device 42 may facilitate communication between origin device 40 and network 20.

In addition, caller identity authentication may be initiated by intermediary device 42. Intermediary device 42 may include database systems that store voice templates and an IP for performing caller identity authentication. In addition, intermediary device 42 may access telco application server 22 outside of trusted telephone network 46 via network 20, where telco application server 22 provides a caller authentication service and/or provides access to a database of voice templates. Intermediary device 42 may include a PSTN switching network or networks. However, intermediary device 42 may also include a PBX, a call center, or other private switching system. Further, intermediary device 42 may include network servers, Websphere® (Websphere® is a registered trademark of International Business Machines Corporation (IBM)) servers, and other systems which provide call processing.

Further, caller identity authentication may be initiated by destination device 44. Destination device 44 may include voice templates and a feature for performing the caller identity authentication. In addition, destination device 44 may access a third party server 49 via network 20, where third party server 49 may provide access to a database of voice templates and/or perform the caller identity authentication. Destination device 44 will prompt a caller to provide a voice utterance at origin device 40, where intermediary device 42 facilitates communications between origin device 40 and destination device 44. Destination device 44 then determines and transmits a VID for the caller to intermediary device 42 for use in specifying services and billing for a call from origin device 40. Destination device 44 may include a callee telephony device, a PBX, a call center, a private switching system, network servers, feature servers, and other systems which provide call receipt. Third party server 48 may include a telco application server, a generic application server, a database management system server, and other systems that function outside trusted telephone network 46. In particular, intermediary device 42 may also facilitate communication between destination device 44 and network 20.

Similarly, a destination device 44 is utilized by a callee to receive a call. Advantageously, an authenticated identity of the callee may be determined as an RVID. Callee identity authentication may be initiated by origin device 40, intermediary device 42, or destination device 44, in a manner similar to initiation of caller identity authentication, as described above.

In particular, both the identity of an intended callee and the identity of an accessed callee may be determined in RVIDS. The intended callee RVID may be authenticated, for example, from a messaging system utilized by the callee.

In addition to authenticating the identity of a caller or callee in a VID or RVID, the context of the call is preferably determined and transmitted as part of the VID or RVID or separate therefrom. Origin device 40, intermediary device 42, telco application server 22, and/or destination device 44 may include context inference services that perform context inference services. A context inference service may utilize context information gathered from multiple databases and may gathered context information directly from a caller or callee in response to prompts.

Context may include, but is not limited to, an intended callee, a subject matter of a call, a device identity, the location of an origin or destination device, billing information, service subscriptions, the path of a call, and other information which may provide a caller or callee with context of a call. Information for determining the context of a call may be gathered from a caller or callee profile, from routing information utilized by intermediary 42 from a device directory, from systems management server 28, or other databases of information. The context inference service may, for example, infer the subject matter of a call as either business or personal based on the identity of the device from which a call originates and the location of that device. Alternatively, the subject of a call as either a business subject or personal subject may be inferred from the billing information context.

From the context of a call, a rating of the caller and/or callee may be determined by a context rating service executing within intermediary device 42 or telco application server 22. In particular, individual ratings may be associated with each portion of the context of a call. In particular, the ratings are preferably determined based on previous ratings for the caller, callee, and/or other context. In addition, both globally accessible and locally accessible databases may store previous ratings.

Figure 3:
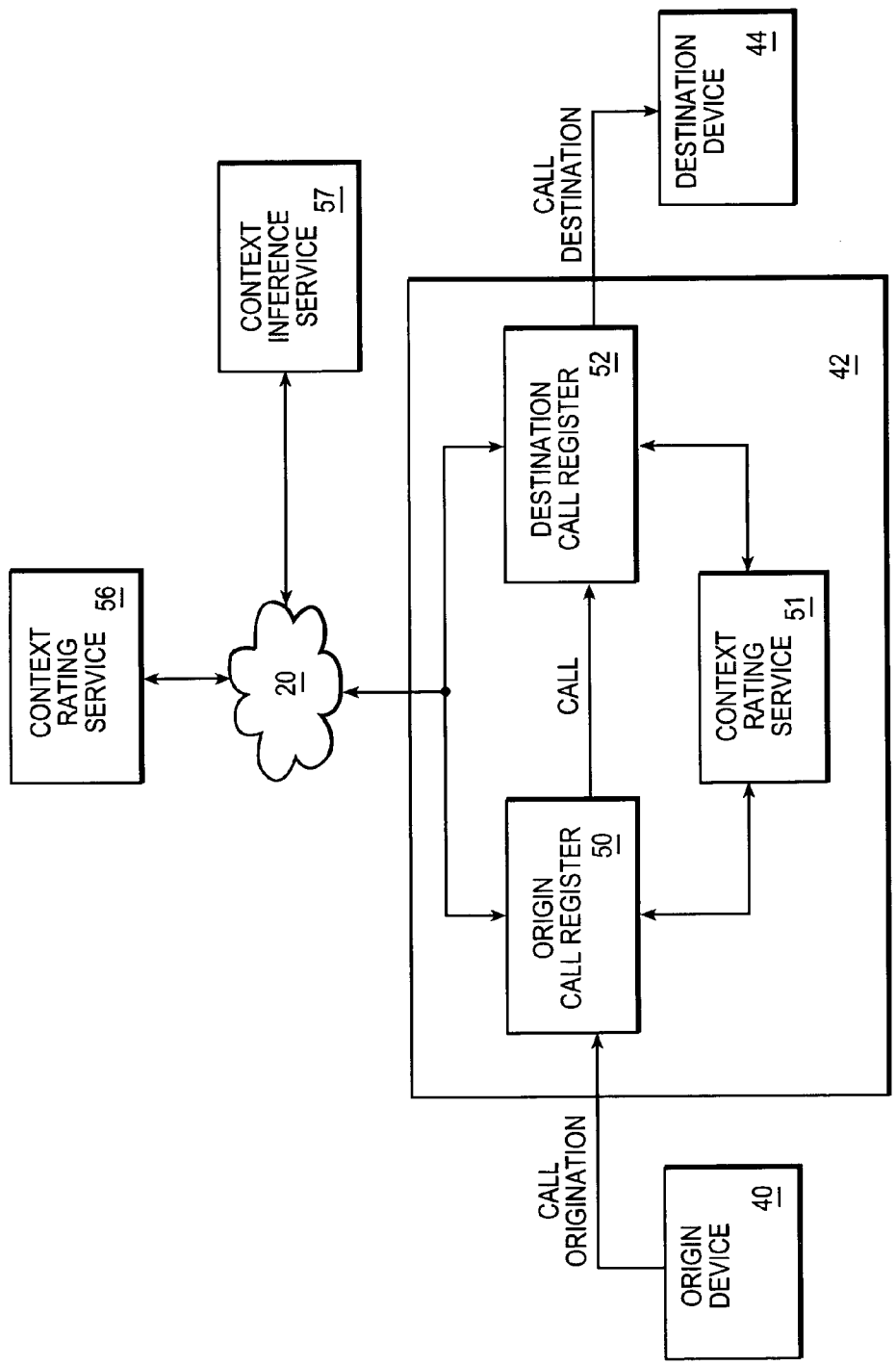
FIG. 3 depicts a block diagram of the flow of a call for context rating in accordance with the method, system, and program of the present invention.

A VID or RVID may be transferred in multiple protocols, including, but not limited to, Interface Definition Language (IDL) and Extensible Markup Language (XML). A VID or RVID may include a range of information, where each type of information may be tagged or identified in some other manner. For example, the following tagged VID may be transmitted to represent an authenticated identity of a caller and context of the call:

[caller name] Jon Smith, sales person
[caller rating] +4
[caller device] Jane Doe's cell phone
[caller location] Central Time zone, Austin, Tex.
[caller on behalf of] Business XYZ
[on behalf of rating] +2
[call subject] Product A
[call subject rating] −2
[call billing] Jon Smith's business service provider C
[authenticated by] Jane Doe's cell phone, service provider C
[ratings compiled from] caller cumulative global ratings, IBM ratings database, callee individual ratings With reference now to FIG. 3, there is depicted a block diagram of the flow of a call for context rating in accordance with the method, system, and program of the present invention. As illustrated, origin device 40 transfers a call request to intermediary device 42. The call request may be an off-hook condition for a wireline device or a network service connection request for a wireless device.

Preferably, a switching service receiving the call request establishes an origin call register 50 and retrieves a line subscriber profile for the origin device line number. The line subscriber profile may be accessed from an SCP or a data storage system external to trusted telephone network 46.

Next, a context inference service may be initiated by the origin switching service. In particular, a context inference service may be located within trusted network 46 as an IP or located outside trusted telephone network 46 within a telco application server accessible via network 20, such as context inference service 57.

The context inference service preferably determines context for a call including, but not limited to, who is calling, an intended callee, the device utilized to place the call, the location of the caller, the billing method for the call, the path of the call, and/or the subject matter of the call. In addition, the context inference service preferably determines context for a call including, but not limited to, who receives a call, the path of line numbers utilized to access the callee, the device utilized to receive the call, the location of the callee, and the subject matter available for discussion by the callee. In addition, other categories of context may be determined.

To determine the context of the device utilized to place a call, the entity subscribing to the line number and/or an identifier for the device are preferably accessed. The first set of context clues is provided to the context inference service by the line subscriber profile. In particular, a line subscriber profile indicates the individual or business that subscribes to a particular line number. Further, a line subscriber profile may indicate that a business subscribes to a telephone service, but provide that service is subscribed to for use by a particular employee or group of employees.

In addition, the line subscriber profile indicates the billing information and services subscribed to by the line subscriber. Billing information may provide context for whether the line number is a business line or personal line. In addition, a billing context for a call may indicate the party responsible for charges incurred in the call.

Further, a line subscriber profile preferably indicates whether the line number is subscribed to for a wireline device, a wireless device, or both. Additional context information may be inferred from whether a wireline or wireless device is utilized.

In addition to determining the identity of a person associated with a line number, detecting and/or inferring the identity of the device itself is particularly advantageous context information. Preferably the identity of the device may be inferred from the line subscriber profile and other information available. A device identity may include a device name, a line number utilized to access the device, and the device type. The device name may be assigned by the line subscriber and output with a signal from the device. Alternatively, the line subscriber profile may indicate the device name. The device type may indicate the type of line utilized to access the device, including, but not limited to, wireline, wireless, or multiplexed. In addition, the device type may indicate the type of device accessed by the line including, but not limited to, a car telephone line, a computer modem line, a PBX land line, a residential line, a business line, or an Asymmetric Digital Subscriber Line (ADSL) multiplexed line.

Further, determining or inferring the location of a device is advantageous context information. For a wireless device, the location of a device may be determined most precisely where a GPS tracking system is utilized by the origin device 40 or intermediary device 42, to determine the exact geographical location of a caller. For a wireline device, the location of the device is fixed according to the location the service is installed for the number.

In addition, for both a wireline and wireless device, a general location of the originated call may be determined from the geographical area covered by the switching center receiving the call. Wireless devices are preferably provided service by a particular tower or other signal distribution point. The geographical location and area covered by that tower may provide a general location of the origin of a call. As the origin device moves from one wireless coverage area to another, the location may be updated.

The context inference service may infer additional context from location information. For example, the time zone of the caller, the direction of movement of the caller, and other location related information may be inferred from location information.

In addition to extending a dial tone to a caller, an identity of the caller is preferably authenticated and loaded into origin call register 50. A caller profile accessed according to the VID is then accessed and loaded into origin call register 50. The context inference service preferably utilizes the caller profile and VID as additional context clues for the call.

The VID provides the context of who is placing the call. The caller profile provides further context based on the billing information and service subscriptions of the caller. In particular, the caller profile may indicate the business on behalf of which a caller places calls and the expertise area of that caller.

In addition, a caller profile may include preferences for filtering context information depending on multiple factors. Such factors may include, but are not limited to, the callee, the device placing the call, the device receiving the call, the time of day, a caller's schedule, and other variables selected by the caller.

The subject matter of a call may be determined by prompting a caller to provide a voice or text entry indicating the subject matter of the call. Alternatively, the context inference service may infer the subject matter of a call based on the caller's schedule. The context inference service may also infer the subject matter of a call based on the caller's business, expertise, or the business associated with the line number utilized by the caller.

In addition, a caller profile may include multiple roles that a caller takes. For example, a caller may be a parent, a business person, a coach, and a volunteer. The context inference service may infer which role the caller is taking depending on other context or may prompt the caller to select a role. Further, the caller may select, at origin device 40, a role for the call when placing the call request.

The context information for the call is transferred to destination device 44, such that the callee is provided with a context for the call. The context information available in destination call register 52 may be filtered prior to transmittal to destination device 44 according to filtering preferences associated with the device, a line subscriber, or the callee. In addition, destination device 44 may filter the context displayed to a callee according to the device capabilities and preferences selected for the device.

Current relevant events for a callee may be determined as part of the context of a call. In particular, an electronic calendar may be accessed according to a callee identity from a caller profile or from an external calendaring data management system. In addition, where other devices are detected within a local network area of the origin device 40, electronic schedules and other event information may be accessed about a current event for the caller from the other devices or according to the identities of other parties participating in an event with the caller. A current relevant event may include a meeting, appointment, location, others involved in the event, duration of the event, and other information that describes the previous, current, or future environments in which a callee may be located.

Advantageously, the destination service provider may initiate a context inference service to determine the context of the recipient side of a call. Determining the context of the recipient side of a call may be performed in a manner similar to that described with reference to determining the context of the caller side of a call. In addition, as will be further described, context inferences may be further enhanced when caller side and recipient side context information is combined.

In particular, the identity of the callee answering the call is preferably authenticated and profiles accessed for the line subscriber and/or callee. Returning an RVID determined for the callee to the caller is advantageous because the RVID preferably includes the callee name and information about the transfer.

Once a context for a call is determined, then context based ratings may be determined for the call. Context based ratings are preferably determined by a context rating service 51 within trusted telephone network 46 or a context rating service 56 within a telco application server.

Ratings may include numerical scales, alphanumeric scales, and other scale basis. For example, a numerical scale from "1 to 10" may rate different aspects of the caller or callee, such as the caller's knowledge of a subject. In another example, an alphanumerical scale may rate the typical content of a call by a caller or callee similarly to the ratings used by Motion Pictures of America (MPA). For example, a caller from a special interest group discussing the death penalty might use graphic terms and phrases to convey meaning, and therefore may have a context rating of "PG" or "R" associated with the call. A callee receiving the call would be required to have approval to answer calls with the context rating or may decide to block all calls with ratings higher than "PG".

The context rating service may access multiple diverse databases to determine context based ratings for a call. In particular, previous ratings may be accessed from local databases, global databases and group based databases within trusted telephone network 46 or accessible via network 20 outside trusted telephone network 46.

A caller or callee profile may include context based ratings. In addition, a profile for a business called on behalf of may include context based ratings. Further, ratings may be distinguished according to other portions of the context, such as a location or billing plan.

In an example, where a particular caller and callee have communicated previously, a first rating may be displayed that indicates the caller's rating of the callee and the caller's rating of the caller from previous calls. Similarly, where a callee has previously spoken with a representative from the same business represented by a caller, a rating by the callee of that business from a previous call may be displayed and a cumulative rating for the caller may be displayed.

In another example, where multiple employees of a manufacturing company interact with a sales person from a parts company, the rating of that sales person by each of the manufacturing company employees may be stored with a profile for the manufacturing company and locally provided to employees of the manufacturing company, but not shared with other companies calling the sales person.

In a further example, a caller or callee profile may indicate a group of VIDs to which ratings by that caller or callee may be shared. Further, a caller or callee may subscribe to a particular rating service where context based ratings for business people are accumulated. A rating subscription service may include enhanced context based ratings. Moreover, a government agency may rate callers, callees, and business organizations, where the rating is automatically attached to a caller or callee identity.

Parties independent of a call, such as the third party rating service, may be allowed by members of the service to monitor calls or may receive ratings by those members during and after calls. In addition, a third party rating service may request for a party to a call to fill out information about the expected content of a call prior to allowing the call to continue. Based on the expected content of the call, the third party rating service may then provide a rating to the callee indicating the ages or persons for whom the content of the call may be suitable. Further, a third party rating service may keep ratings of different companies and telemarketers on file.

In yet another example, a telephone service provider utilized by a caller may be rated, such that a callee is provided with a rating of the reliability of the service provider in particular locations, particularly where that service provider is a wireless service provider.

Ratings from multiple services and locations may be reported simultaneously. For example, a telephone service provider may have one rating database while a consumer reporting group has another rating database where reports from both groups may be displayed for a call. Ratings from multiple sources may be displayed independent of each other or averaged together, for example.

Advantageously, the identities of parties to a call and other context of the call are monitored during the call and call context is dynamically adjusted. As a call context adjusts, the ratings associated with the call context preferably also adjust. For example, if a first caller places a call, but during continuous validation of the call a second caller voice is authenticated, the call context is updated to include the second caller identity and the ratings for that second caller identity are included. Other examples of call context adjustments include, but are not limited to, adjustment to the number of minutes available for a call, adjustment to the money available for paying for a call, adjustment in the location of a party to the call, adjustments in the schedule of a party to the call, and adjustment to the ratings of business represented by parties during the call.

Figure 4:
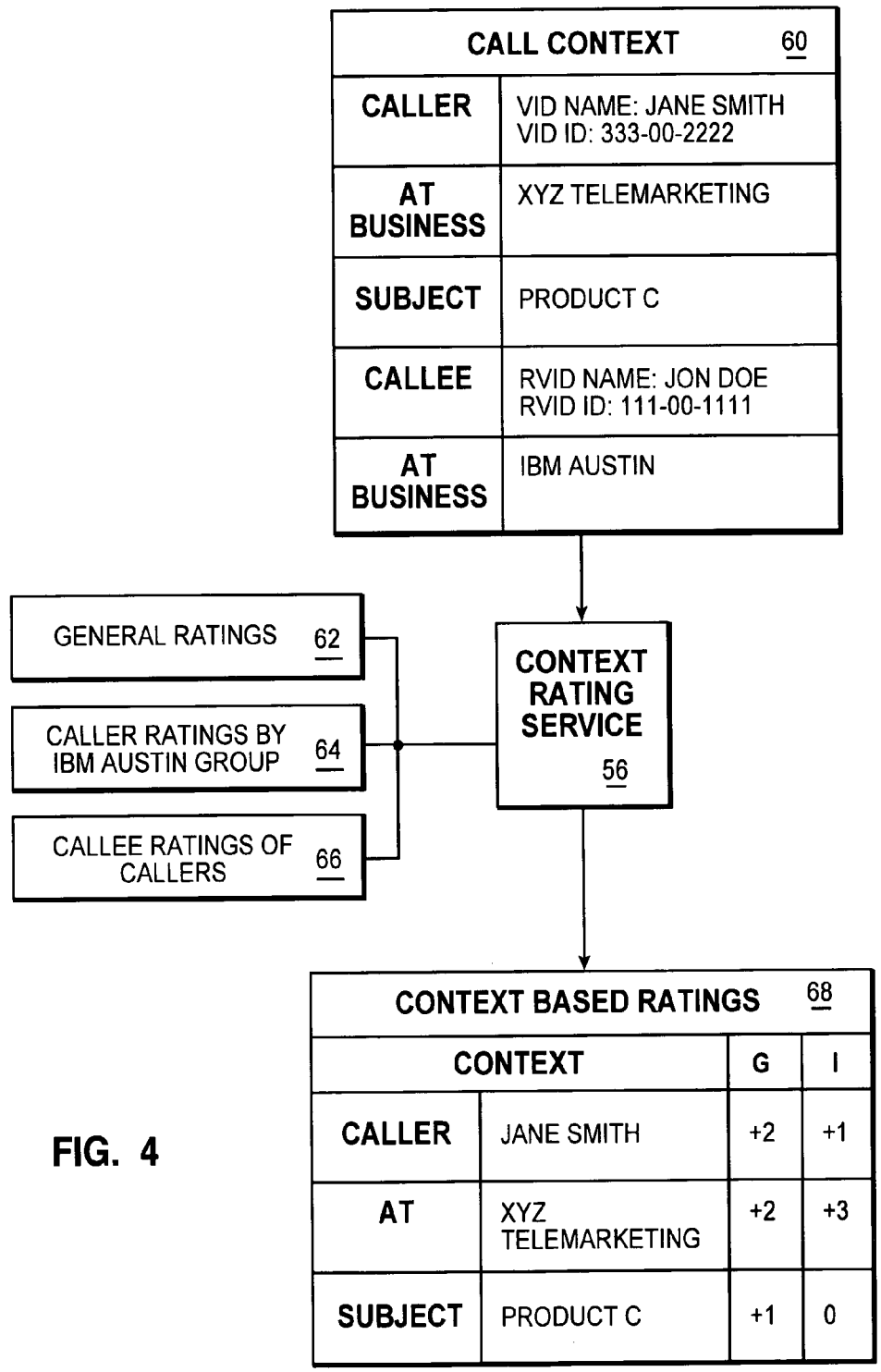
FIG. 4 illustrates an illustrative example of a caller based rating output in accordance with the method, system, and program of the present invention.

Referring now to FIG. 4, there is depicted an illustrative example of a caller based rating output in accordance with the method, system, and program of the present invention. Preferably, a context inference service determines the context for a call including, but not limited to, the parties to the call, devices utilized for a call, line numbers accessed for a call, service providers for a call, billing plan for a call, location of parties to the call, subject matter of the call, billed transactions occurring during a call, parties called on behalf of for a call, backup parties accessed during a call, path of a call, and other context related information.

In the example, call context 60 is determined by the context inference service and transferred to context rating service 56. Call context 60 includes the caller identity, the business the caller represents, the subject of the call, the callee identity, and the business the callee represents. Although not depicted, other types of context may be included in call context 60 such as the service provider for the call, the billing plan for the call, the devices utilized by the caller and callee, the locations of the caller and the callee, the path of the call to the current caller and callee, and other context related information.

Context rating service 56 may access multiple rating databases to determine context based ratings for call context 60. In the example, context rating service 56 accesses general ratings database 62, caller ratings by the IBM Austin group database 64, and callee ratings of callers database 66. The databases may be accessible within the trusted telephone network, outside the trusted telephone network, and/or from a telephony device.

General ratings database 62 preferably includes cumulative ratings for the caller when calling or receiving calls for the XYZ Corporation. In addition, general ratings database 62 includes cumulative ratings for the XYZ Corporation. General ratings may be accumulated over a selected period of time. General ratings database 62 may be stored in association with the caller identity, the XYZ Corporation identity, or other context. In addition, general ratings database 62 may be stored by a ratings subscription service, a service provider, the XYZ Corporation, or other entities.

Caller ratings by IBM Austin group database 64 preferably include cumulative ratings by other employees in the IBM Austin group according to call contexts. In the example, the callee is a member of the IBM Austin group, therefore ratings related to the current call context are accessed from group database 64. A private switching network may maintain group database 64. Alternatively, group database 64 may be accessed from outside a trusted telephone network, for example.

Callee ratings of callers database 66 preferably includes ratings by the callee of previous callers according to context. For purposes of the example, the callee has previously rated the current caller. Callers database 66 may be stored at the telephony device utilized by the callee, at a data storage system within the trusted telephone network, or at a data storage system outside the trusted telephone network.

In the example, context based ratings 68 for output to the callee telephony device are determined by context rating service 56. The callee receives the caller identity, the business represented by the caller and the subject of the call. In addition, a general rating (G) accumulated from general ratings database 62 and group database 64 may be output in association with the context. Further, an individual rating (I) accumulated from callers database 66 may be output in association with the context.

As illustrated, a rating may be determined for each portion of the context. Here, the caller is rated, the business is rated, and the subject is rated. In alternate embodiments, a single rating may be determined for multiple portions of the context. In addition, in alternate embodiments, portions of the context may be rated with reference to one another.

In addition to determining context based ratings 68 for output to the callee, context based ratings for output to the caller may be determined. For example, although not depicted, the ratings for the callee may be determined from the same types of databases utilized to determine the ratings for the caller.

Figure 5:
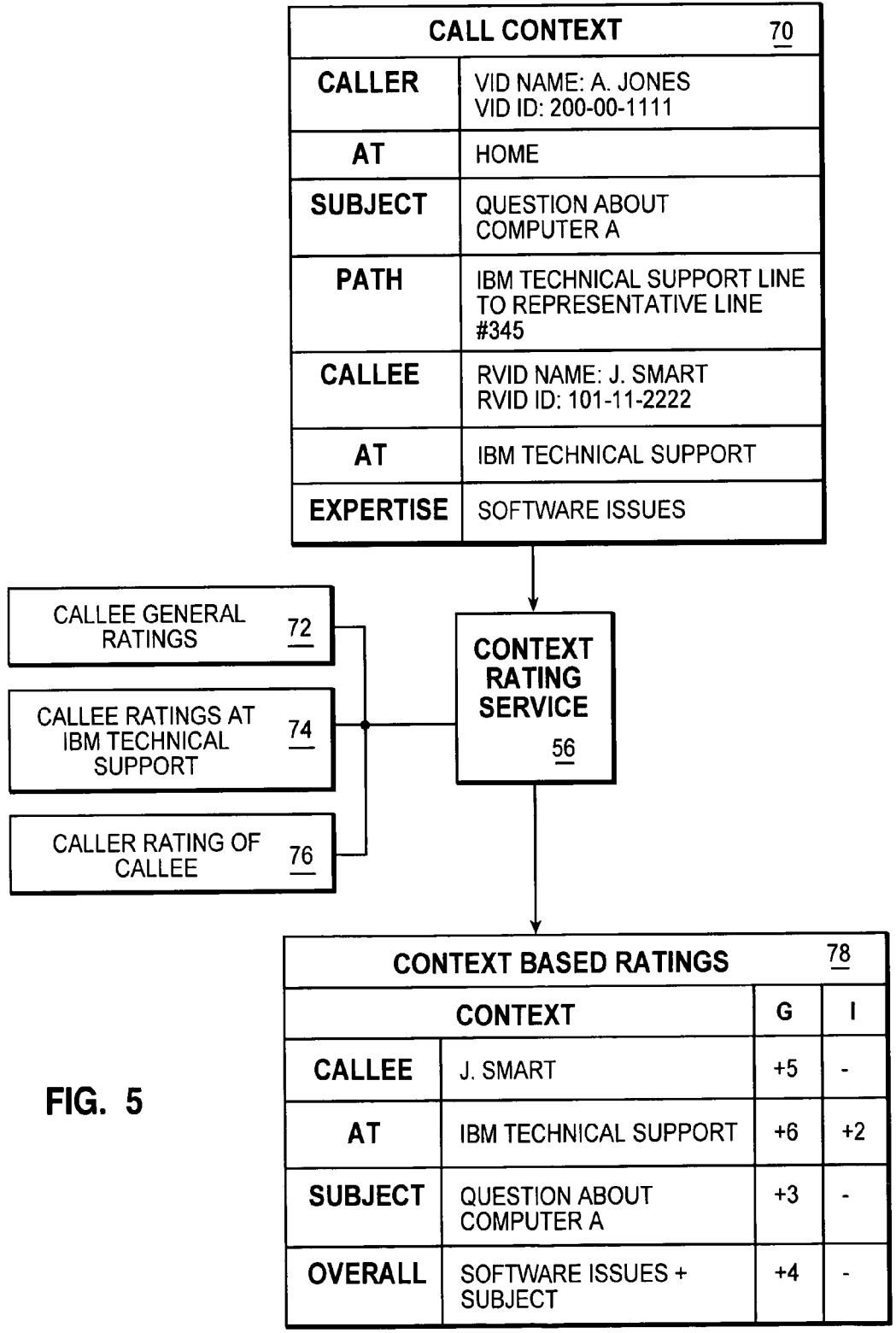
FIG. 5 depicts an illustrative example of a callee rating in accordance with the method, system, and program of the present invention.

With reference now to FIG. 5, there is depicted an illustrative example of a callee based rating output in accordance with the method, system, and program of the present invention. In this example, a call context 70 indicates that a caller has dialed a technical support line and is connected to a representative.

In this example, it is advantageous to provide the caller with a rating of the representative accessed according to the call context. In addition, although not depicted, it may be advantageous to provide the representative answering the call with a rating of the caller.

Preferably, context rating service 56 receives call context 70 and accesses a callee general ratings database 72, a callee ratings at IBM technical support database 74, and a caller rating of the callee database 76. Ratings database 72 preferably includes general ratings for the callee and for the IBM technical support department. Support database 74 preferably includes internal ratings of the callee according to the callee's expertise in answering particular types of questions. Callee database 76 preferably includes ratings by the caller of the callee and the technical support line. Databases may be stored at a telephony device, within a private switching network, within a trusted telephone network, and outside a trusted telephone network, for example. In addition, other databases of rating information may be accessed.

Context rating service 56 preferably filters context based ratings 78 for output to the caller. In the example, a general rating (G) is compiled from ratings database 72 and support database 74. Ratings are individually apportioned to the callee, the technical support department, the subject and an overall rating of the callee's expertise in view of the subject of the call. In addition, in the example, an individual rating (I) is determined from callee database 76.

Advantageously, by providing the caller with context based ratings of the callee, the callee may determine whether to continue the call with the selected representative. The context based ratings may indicate that the callee is not skilled to discuss the requested subject. Alternatively, the context based ratings may indicate that the callee is only skilled to answer a portion of the subject matter requested by the caller.

Further, advantageously the present caller is allowed to rate the callee before, during, and after the call, such that a greater level of respect for customers may be built since feedback on job performance is directly reported. Allowing customers to rate representatives is best performed in a trust relationship where the representative may also rate the customer according to the customer's level of knowledge at the beginning of a call and the skills provided to the customer during the call. If a customer is quickly prone to agitation or is very mild mannered, both of these types of ratings may be designated by a representative, such that representatives answering calls from the customer in the future may better respond to the customer.

Figure 6A:
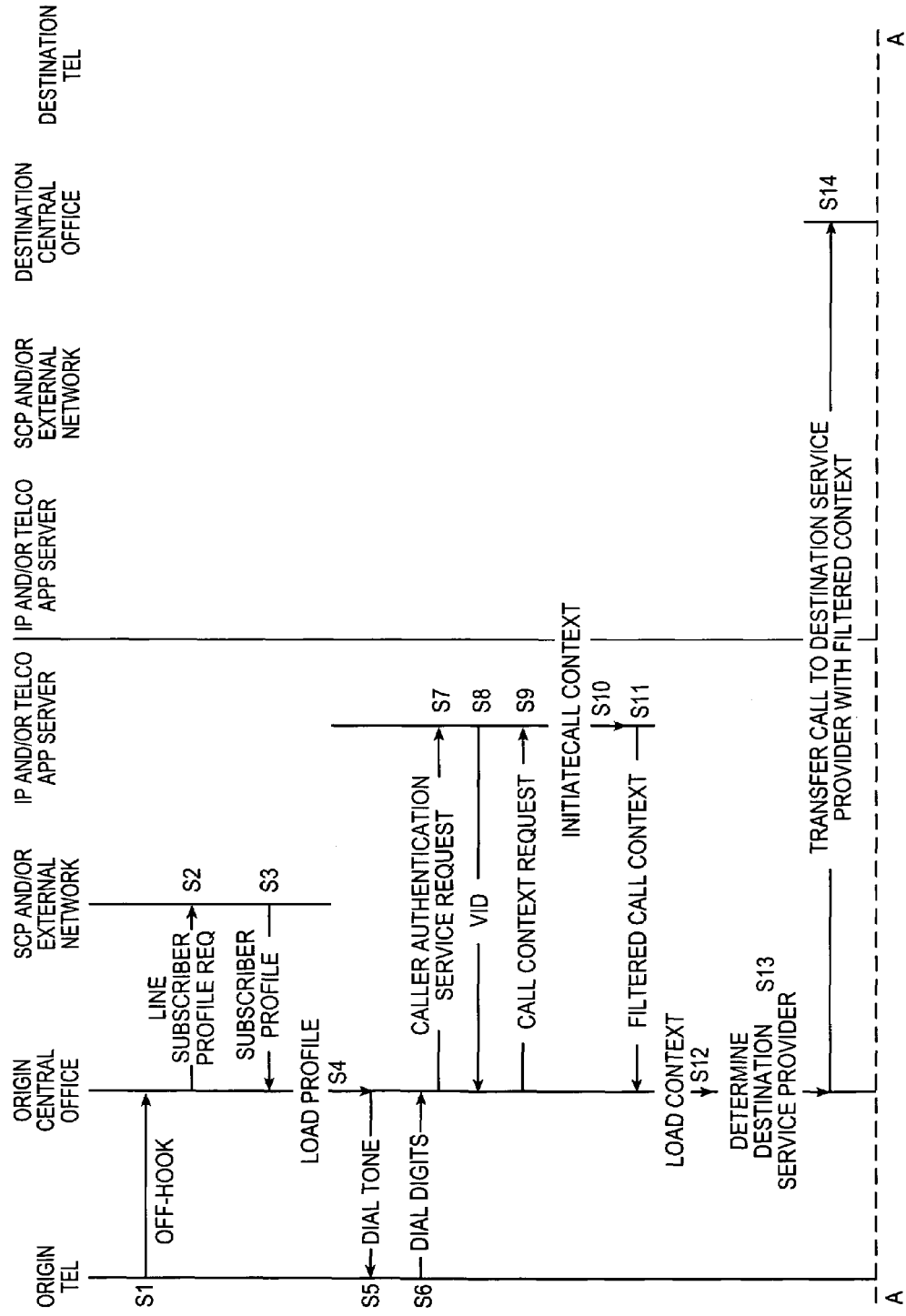
FIGS. 6*a*–6*b* illustrate a flow diagram of a signal flow and processing of a call in accordance with the method, system, and program of the present invention.
Figure 6B:
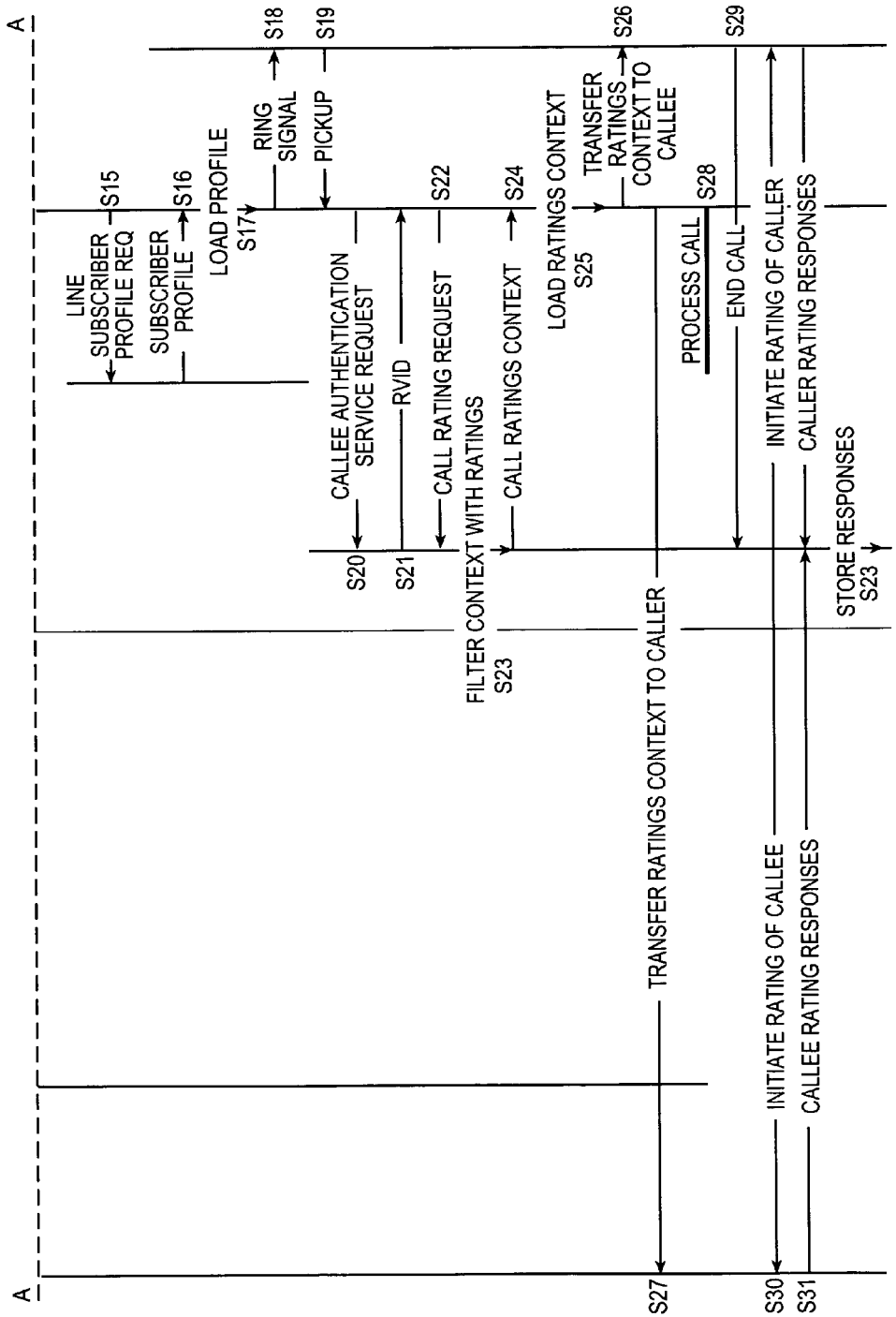

Referring now to FIGS. 6a–6b, there is depicted a flow diagram of a signal flow and processing of a call in accordance with the method, system, and program of the present invention. A standard telephone device is assumed for the "tel" origin device and destination device in the present example. However, a similar signal flow may be applied to other types of origin and destination devices, including server systems, private switching networks, and call centers. Further, the flow is described with reference to wireline devices, however is not limited in application to wireline devices.

The caller lifts a handset creating an off-hook state in the origin device and a corresponding change in state of an off-hook signal to the central office (step S1). In response to detecting an off-hook state in the origin device, the central office establishes a register for the call and requests a line subscriber profile from the SCP and/or an external network server (step S2). A line subscriber profile including preferred services and a billing plan is returned to the central office (step S3). The central office loads the line subscriber profile into the call register (step S4) and extends a dial tone to the origin device (step S5).

The origin device then transmits dialed digits to the central office (step S6). A caller may utilize a keypad to enter a telephone number or utilize a voice dial feature if available. In addition, a caller may provide an intended callee identifier. Dialed digits may be received at other points in the process and loaded into the call register until needed for processing the call.

Next, the central office extends a caller authentication service request to an IP or to the telco application server (step S7). The caller authentication server will prompt a caller to provide a voice utterance, match the voice utterance with a voice template and authenticate the caller identity as a VID which is returned to the central office (step S8).

Alternatively, the origin device or destination device may perform caller authentication, where the VID is received from the origin device or destination device.

Thereafter, the central office extends a call context request to a context inference service available from an IP or telco application server (step S9). A call context inference is initiated (step S10). The context inference service preferably accesses and loads a caller profile according to VID into the origin call register. Utilizing the line number, line subscriber profile, VID and caller profile, the context inference service preferably determines a context for the call.

The context inference service preferably filters the context and designates certain portions of the context for receipt by certain entities. The filtered call context is returned to the origin central office (step S11). Next, the context is loaded into the call register (step S12).

A destination service provider for the call according to the dialed digits is determined from a directory (step S13). Next, the call is transferred to the destination service provider with filtered context (step S14). Alternatively, a search engine may send out queries to multiple line numbers searching for the callee.

Upon receiving a call at a destination service provider central office, a call register is established for the call and the line subscriber profile request is initiated to a SCP or external network database (step S15). The line subscriber profile is returned to the central office (step S16) and loaded into the call register (step S17).

Next, a ring signal is extended to the destination device (step S18). In response to detecting an answer at the destination device, a pickup signal is returned to the destination service provider (step S19).

In response to detecting a pickup signal, a callee authentication service request is transferred to an IP or telco application service (step S20). The IP or telco application service determines an RVID for the callee and returns the RVID to the destination service provider (step S21). The destination service provider then transfers a call rating request to the IP or telco service provider functioning as a context rating service (step S22). Advantageously, the context rating service requests an updated context for the call according to the caller and callee identities and profiles. In addition, the context rating service accesses ratings databases that are relevant to the current call context. The context based ratings are filtered (step S23) and transferred to the destination service provider (step S24). The ratings context is loaded into the call register at the destination service provider (step S25).

Next, the context based ratings are transferred to the callee (step S26) and to the caller (step S27). Thereafter, the call is processed according to the selections of the caller and callee (step S28).

Figure 7:
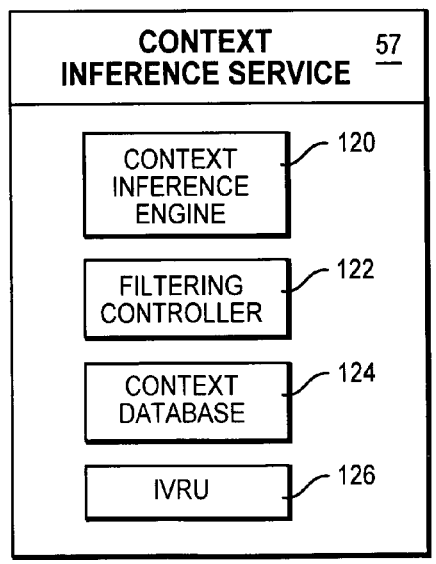
FIG. 7 depicts a block diagram of a context inference service in accordance with the method, system, and program of the present invention.

An end of call signal is transferred from the destination device to the context rating service when the call is at an end (step S29). The context rating service preferably initiate the rating of the caller by the callee and the callee by the caller (step S30). Rating responses by the caller and the callee are then retrieved by the context rating service (step S31) and distributed to relevant databases for storage (step S32). In particular, while in the present example the context rating service is initiated after the end of a call is detected, in alternate embodiments, the With reference now to FIG. 7, there is illustrated a block diagram of a context inference service in accordance with the method, system, and program of the present invention. Context inference service 57 is preferably housed within a computing system including at least a processor, memory, system software, application software, and network software that execute to provide a telco service.

In particular, context inference service 57 includes a context inference engine 120. Context inference engine 120 preferably determines the context for a call through information accessible for the call and through inferences from that information. In addition, context inference engine 120 may filter context information for each entity receiving that information.

A filtering controller 122 preferably filters context determined by context inference engine 120 according to filtering preferences of the caller. In addition, the line number subscriber may designate filtering preferences for context including the line number.

A context database 124 preferably records and stores context for each call processed by context inference service 57. Context database 124 may be later accessed to provide verification and context for billed call transactions. In addition, context database 124 may store records of lengths of calls such that lengths of future calls may be predicted.

An interactive voice recognition unit (IVRU) 126 preferably prompts the caller and callee to provide information required for determining context and detects caller or callee entries. In addition, IVRU 126 may prompt the caller and callee to designate additional preferences for filtering context.

Figure 8:
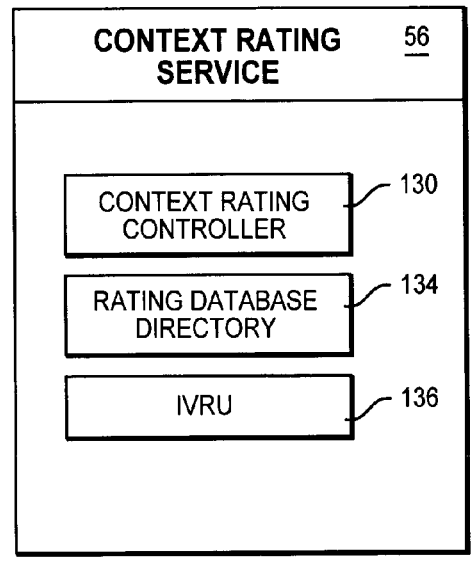
FIG. 8 illustrates a block diagram of a context rating service in accordance with the method, system, and program of the present invention.

Referring now to FIG. 8, there is illustrated a block diagram of a context rating service in accordance with the method, system, and program of the present invention. Context rating service 56 is preferably housed within a computing system including at least a processor, memory, system software, application software, and network software that execute to provide a telco service.

In particular, context rating service 56 includes a context rating controller 130. Context rating controller 130 preferably determines the context based ratings for a call through ratings databases relevant for a particular call context. In addition, context rating controller 130 may filter rating information according to the different portions of a call context and the individuals or groups providing the ratings.

A rating database directory 134 preferably includes a directory of ratings databases selectable according to the context of the call. The directory may be updated by caller and callee profile information indicating the location of individual ratings databases. In addition, the directory may be updated by a private switching network or rating subscription service authorized for access by the caller or callee.

Another function of context rating controller 130 is controlling the acquisition of ratings for current calls. Before, during, or after a call, controller 130 may initiate IVRU 136 to prompt the caller and callee to indicate ratings for different portions of the context of a call. Controller 130 then accesses the relevant ratings databases and transfers the ratings to those relevant ratings databases.

Figure 9:
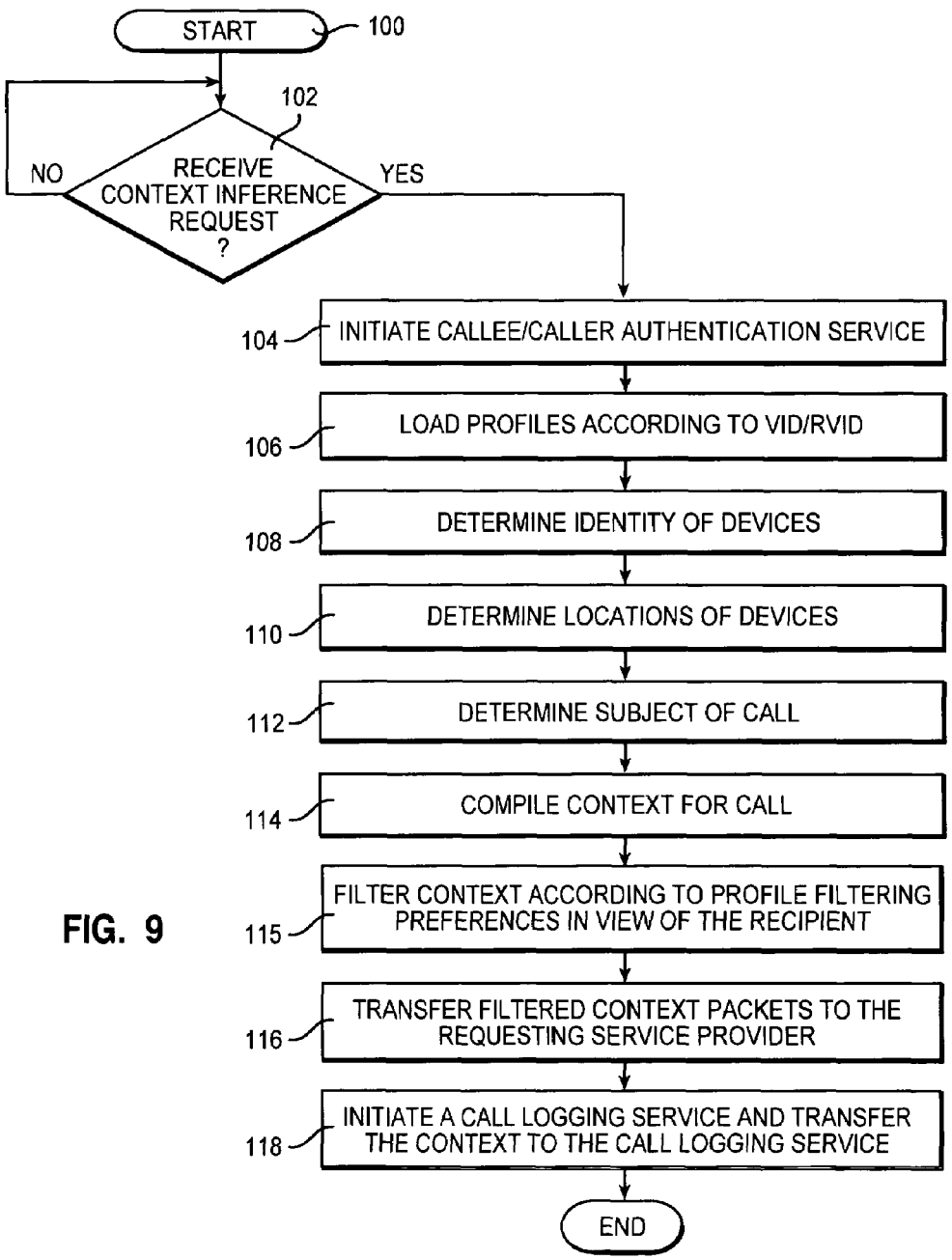
FIG. 9 depicts a high level logic flowchart of a process and program for controlling a context inference service in accordance with the method, system, and program of the present invention.

Referring now to FIG. 9, there is illustrated a high level logic flowchart of a process and program for determining call context in accordance with the present invention. As depicted, the process starts at block 100 and thereafter proceeds to block 102. Block 102 illustrates a determination as to whether a call context request is received. If a call context request is not received, then the process iterates at block 102. If call context request is received, then the process passes to block 104. A call context request may also include line subscriber profile information and other call information already loaded by Block 104 depicts initiating a caller/callee identity authentication service. Next, block 106 illustrates loading profiles according to the VID/RVID authenticated for the caller/callee. Alternatively,. VID/RVID for the call may be transferred with the call context request.

Next, block 108 illustrates determining the identity of any devices utilized in the call. Where a server enables a call from an individual telephone device, the identities of the individual telephone device and the server are preferably determined. Device identity may be determined from the line subscriber identity, a device identity output by the device, the type of service subscribed to for the device, and other available profile information.

Block 110 depicts determining the locations of any devices utilized in the call. Location may be precisely detected from a GPS coordinate. Alternatively, location may be inferred within a general area according to the geographical area covered by an office switch or a wireless tower originating or terminating the call. Further, location may be determined by the physical address assigned to a line number.

Block 112 illustrates determining the subject matter of a call. Subject matter may be inferred, for example, from services subscribed to by the caller/callee, from previous subject matter of calls between the parties, from the location of the calling party, or from the device identities. In addition, a party to a call may be prompted to :indicate the subject matter of a call.

Thereafter, block 114 depicts compiling the context information for a call. In compiling context information, the information utilized to determine context is preferably consolidated into general context categories. In addition, block 115 illustrates filtering the context information for a call according to caller and callee profile preferences. Next, block 116 illustrates transferring the call context to the requesting service provider.

Block 118 depicts initiating a call logging service and transferring the call context to the call logging service, and the process ends. In particular, a caller or callee profile may indicate call logging preferences that are included in the context transferred to the call logging service. Alternatively, the call logging service: may access call logging preferences for the caller, callee, or third party.

Figure 10:
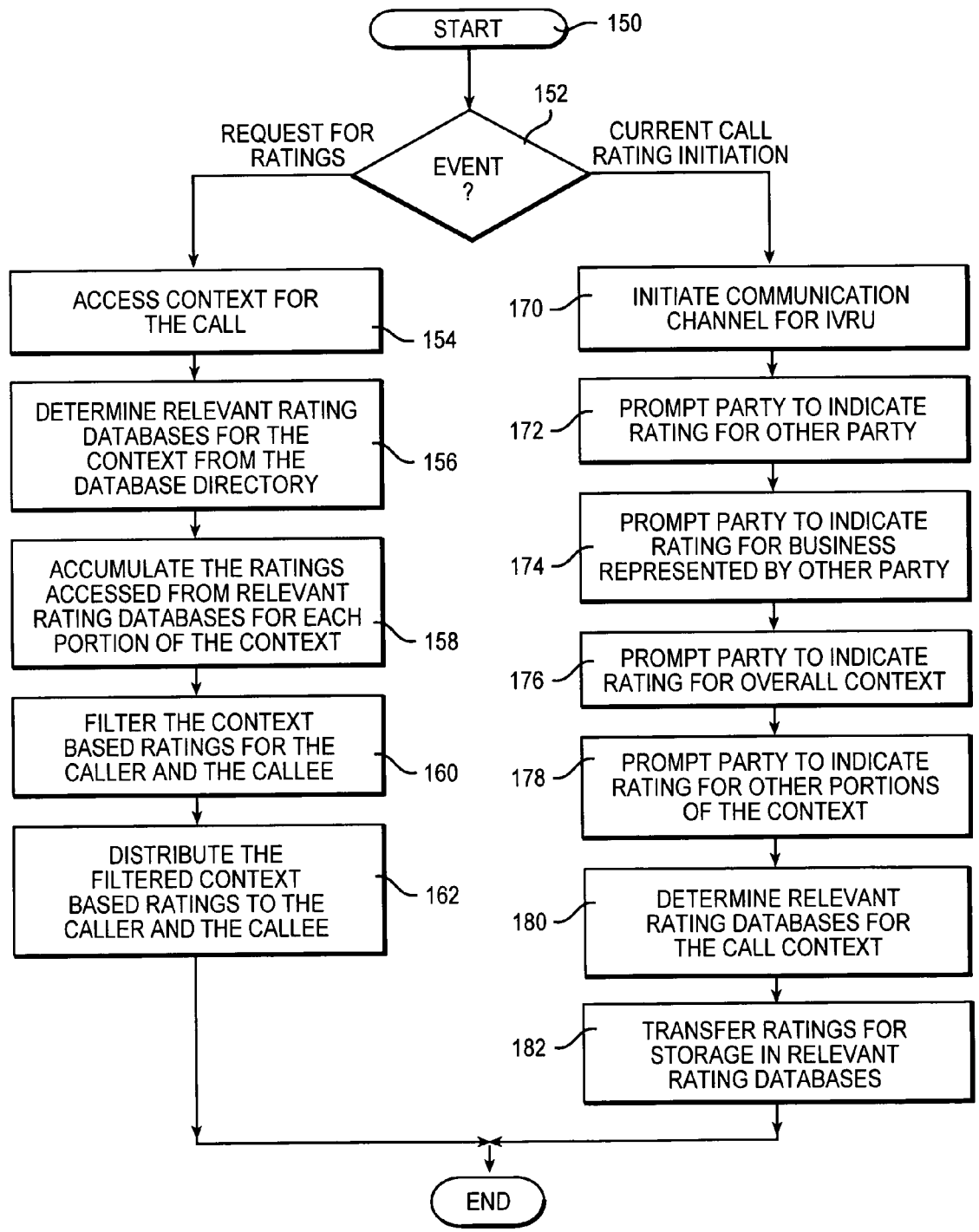
FIG. 10 illustrates a high level logic flowchart of a process and program for controlling a context rating service in accordance with the method, system, and program of the present invention.

With reference now to FIG. 10, there is depicted a high level logic flowchart of a process and program for controlling a context rating service in accordance with the method, system, and program of the present invention. As illustrated, the process starts at block 150 and thereafter proceeds to block 152. Block 152 depicts a determination as to which event occurred when an event occurs. If a request for ratings is received, then the process passes to block 154. If a current call rating initiation is received, then the process passes to block 170.

Block 154 depicts accessing the context for a call from a context inference service. In particular, the context may include multiple categories, such as the identities of the parties to the call, the locations of the parties to the call, the business represented by the parties to the call, the subject matter of the call, the expertise of the parties to the call, and the line numbers accessed during the call. However, the context may be limited to just the identities of the parties to the call or the line numbers accessed during a call.

Next, block 156 illustrates determining the relevant rating databases for the context from the database directory. Thereafter, block 158 depicts accumulating the ratings accessed from the relevant rating databases for each portion of the context.

Block 160 illustrates filtering the context based ratings for the caller and the callee. Next, block 162 depicts distributing the filtered context based ratings to the caller and the callee telephony devices, and the process ends.

Block 170 depicts initiating the communication channel for the IVRU of the context rating service. Next, block 172 illustrates prompting one party to indicate a rating for the other party. Thereafter, block 174 depicts prompting the one party to indicate a rating for the business represented by the other party. Further, block 176 illustrates prompting the one party to indicate a rating for the overall call context. In addition, block 178 depicts prompting the one party to indicate a rating for other portions of the context, such as the location, the service provider, the billing plan, and other context information.

Block 180 illustrates determining the relevant rating databases for the call context. Further, block 182 depicts transferring the ratings for storage in the relevant rating databases, and the process ends. In particular, the relevant rating databases may be stored at telephony devices, at private switching networks, within the trusted telephone network, or outside the trusted telephone network, for example.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

While the invention has been particularly shown and described with reference to a preferred embodiment, it will be understood by those skilled in the art that various changes in form and detail may be made therein without departing from the spirit and scope of the invention.

What is claimed is:

1. A method for rating a party to a call comprising:
    detecting, at a context rating service accessible via a packet switching network communicatively connected via a secure gateway to a call supported within a trusted telephone network, an identity of a first party to said call with an identification of a device that performed a voice authentication of said identity of said first party and a context of said call;
    requesting a second party to said call to rate said first party to said call and said context of said call through a communication from said context rating service to said second party;
    responsive to receiving at said context rating service said rating entered by said second party, selecting at least one relevant context rating database for a type of said rating from among a plurality of context rating databases each for storing a separate selection of types of ratings and each accessible to one of said context rating service and a plurality of separate context rating services accessible across said packet switching network; and
    storing said rating by said second party, said identification of said device that performed said voice authentication of said identity of said first party, and said context of said call in association with said identity of said first party to said call in said at least one relevant context rating database.

2. The method for rating a party to a call according to claim 1, wherein detecting an identity further comprises:
   detecting at least one from among a name of said first party, a line number utilized by said first party, a business represented by said first party, a location of said first party, a subject of said call initiated by said first party, and a billing plan for said first party.

3. The method for rating a party to a call according to claim 1, wherein requesting a second party further comprises:
   prompting said second party, through said communication from said context rating service, to rate at least one from among an individual representing said first party, a business representing said first party, and a context of said call.

4. The method for rating a party to a call according to claim 1, wherein storing said rating further comprises:
   storing said rating for retrieval by only said second party to said call.

5. The method for rating a party to a call according to claim 1, wherein storing said rating further comprises:
   storing said rating, said identification of said device that performed said voice authentication of said identity of said first party, and said context of said call for accumulation with other ratings for said identity of said first party in said at least one relevant context rating database.

6. The method for rating a party to a call according to claim 1, further comprising:
   detecting, at said context rating service, an identity of said second party to said call with an identification of a second device that performed a voice authentication of said identity of said second party;
   selecting said at least one relevant context rating database for storage of said rating in association with said second party from among said plurality of context rating databases; and
   storing said rating by said second party of said first party and said identification of said second device that performed said voice authentication of said identity of said second party in association with said identity of said second party in said at least one relevant context rating database.

7. The method for rating a party to a call according to claim 1, further comprising:
   selecting said at least one relevant context rating database from among said plurality of context rating databases for storage of said rating in association with said context of said call, wherein said context comprises a separate identifier of a type of each of a first telephony device used by said first party and a second telephony device used by said second party, a separate location of each of said first telephony device and said second telephony device, and a subject of said call.

8. The method for rating a party to a call according to claim 7, wherein said context of said call comprises at least one from among a subject of said call, a billed transaction completed during said call, a product purchased during said call, a location of said first party and said second party during said call, a billing plan for said call, an identity of said first party to said call, a length of said call, a path of said call, and an identity of said second party to said call.

9. The method for rating a party to a call according to claim 1, wherein said first party is a caller and said second party is a callee.

10. The method for rating a party to a call according to claim 1, wherein said first party is a callee and a second party is a caller.

11. A method for identifying a party to a call comprising:
   detecting, at a particular context rating service from among a plurality of separate context rating services accessible via a packet switching network communicatively connected via a secure gateway to a call supported within a trusted telephone network, an identity of a first party to said call with an identification of a device that performed a voice authentication of said identity of said first party;
   compiling, at said particular context rating service, a current rating for said first party according to previous ratings for said first party retrieved from at least one from among a plurality of context databases each comprising at least one previous rating entry associated with said identity of said first party and stored by at least one from among said plurality of separate context rating services, wherein said plurality of context databases are each accessible to one of said particular context rating service only and separate selections of said plurality of separate context rating services; and
   controlling output of said current rating to a second party to said call.

12. A system for rating a party to a call comprising:
   a context rating service accessible via a packet switching network communicatively connected via a secure gateway to a call between a first party and a second party enabled by a trusted telephone network;
   said context rating service further comprising:
      means for detecting an identity of said first party to said call with an identification of a device that performed a voice authentication of said identity of said first party and a context of said call;
      means for requesting said second party to said call to rate said first party to said call and said context of said call through a communication from said context rating service to said second party;
      means, responsive to receiving said rating entered by said second party, for selecting at least one relevant context rating database for a type of said rating from among a plurality of context rating databases each for storing a separate selection of types of ratings and each accessible to one of said context rating service and a plurality of separate context rating services accessible across said packet switching network; and
      means for storing said rating by said second party, said identification of said device that performed said voice authentication of said identity of said first party, and said context of said call in association with said identity of said first party to said call in said at least one relevant context rating database.

13. The system for rating a party to a call according to claim 12, wherein said means for detecting said identity further comprises:
   means for detecting at least one from among a name of said first party, a line number utilized by said first party, a business represented by said first party, a location of said first party, a subject of said call initiated by said first party, and a billing plan for said first party.

14. The system for rating a party to a call according to claim 12, wherein said means for requesting said second party further comprises:

means for prompting, through said communication from said context rating service, said second party to rate at least one from among an individual representing said first party, a business representing said first party, and a context of said call.

15. The system for rating a party to a call according to claim 12, wherein said means for storing said rating further comprises:
means for storing said rating for retrieval by only said second party to said call.

16. The system for rating a party to a call according to claim 12, wherein said means for storing said rating further comprises:
means for storing said rating, said identification of said device that performed said voice authentication of said identity of said first party, and said context of said call for accumulation with other ratings for said identity of said first party in said at least one relevant context rating database.

17. The system for rating a party to a call according to claim 12, said context rating service further comprising:
means for detecting, at said context rating service, an identity of said second party to said call with an identification of a second device that performed a voice authentication of said identity of said second party;
means for selecting said at least one relevant context rating database for storage of said rating in association with said second party from among said plurality of context rating databases; and
means for storing said rating by said second party of said first party and said identification of said second device that performed said voice authentication of said identity of said second party in association with said identity of said second party in said at least one relevant context rating database.

18. The system for rating a party to a call according to claim 12, said context rating service further comprising:
means for selecting said at least one relevant context rating database from among said plurality of context rating databases for storage of said rating in association with said context of said call, wherein said context comprises a separate identifier of a type of each of a first telephony device used by said first party and a second telephony device used by said second party, a separate location of each of said first telephony device and said second telephony device, and a subject of said call.

19. The system for rating a party to a call according to claim 18, wherein said context of said call comprises at least one from among a subject of said call, a billed transaction completed during said call, a product purchased during said call, a location of said first party and said second party during said call, a billing plan for said call, an identity of said first party to said call, a length of said call, a path of said call, and an identity of said second party to said call.

20. The system for rating a party to a call according to claim 12, wherein said first party is a caller and said second party is a callee.

21. The system for rating a party to a call according to claim 12, wherein said first party is a callee and a second party is a caller.

22. A computer program product for rating a party to a call comprising:
a recording medium;
means, recorded on said recording medium, for detecting, at a context rating service accessible via a packet switching network communicatively connected via a secure gateway to a call supported within a trusted telephone network, an identity of a first party to said call with an identification of a device that performed a voice authentication of said identity of said first party and a context of said call
means, recorded on said recording medium, for requesting a second party to said call to rate said first party to said call and said context of said call through a communication from said context rating service to said second party;
means, recording on said recording medium, responsive to receiving at said context rating service said rating entered by said second party, for selecting at least one relevant context rating database for a type of said rating from among a plurality of context rating databases each for storing a separate selection of types of ratings and each accessible to one of said context rating service and a plurality of separate context rating services accessible across said packet switching network; and
means, recorded on said recording medium, for storing said rating by said second party, said identification of said device that performed said voice authentication of said identity of said first party, and said context of said call in association with said identity of said first party to said call in said at least one relevant context rating database.

23. The computer program product for rating a party to a call according to claim 22, further comprising:
means, recorded on said recording medium, for detecting at least one from among a name of said first party, a line number utilized by said first party, a business represented by said first party, a location of said first party, a subject of said call initiated by said first party, and a billing plan for said first party.

24. The computer program product for rating a party to a call according to claim 22, further comprising:
means, recorded on said recording medium, for prompting said second party to rate at least one from among an individual representing said first party, a business representing said first party, and a context of said call.

25. The computer program product for rating a party to a call according to claim 22, wherein said means for storing said rating further comprises:
means, recorded on said recording medium, for storing said rating for retrieval by only said second party to said call.

26. The computer program product for rating a party to a call according to claim 22, wherein said means for storing said rating further comprises:
means, recorded on said recording medium, for storing said rating storing said rating, said identification of said device that performed said voice authentication of said identity of said first party, and said context of said call for accumulation with other ratings for said identity of said first party in said at least one relevant context rating database.

27. The computer program product for rating a party to a call according to claim 22, further comprising:
means, recorded on said recording medium, for detecting, at said context rating service, an identity of said second party to said call with an identification of a second device that performed a voice authentication of said identity of said second party;
means, recorded on said recording medium, for selecting said at least one relevant context rating database for storage of said rating in association with said second party from among said plurality of context rating databases; and means, recorded on said recording medium, for storing said rating by said second party of said first party and said identification of said second device that performed said voice authentication of said identity of said second party in association with said identity of said second party in said at least one relevant context rating database.

28. The computer program product for rating a party to a call according to claim 22, further comprising:

means, recorded on said recording medium, for selecting said at least one relevant context rating database from among said plurality of context rating databases for storage of said rating in association with said context of said call, wherein said context comprises a separate identifier of a type of each of a first telephony device used by said first party and a second telephony device used by said second party, a separate location of each of said first telephony device and said second telephony device, and a subject of said call.

29. A method for independent party ratings comprising:

monitoring a context of a call by an independent party of said call, wherein said party monitors said context of said call from an independent service via a packet switching network communicatively connected via a secure gateway to said call supported within a trusted telephone network, wherein said context of said call comprises at least one identity of at least one party to said call with at least one identification of a device that performed a voice authentication of said identity;

identifying, at said independent service, a rating for said call assigned by said independent party; and storing, by said independent service, said rating by said independent party in association with said context in at least one context rating database from among a plurality of context rating databases each accessible to one of said independent service and a plurality of separate services accessible across said packet switching network, wherein said rating is retrievable by a subsequent party to at least one portion of said call.

30. The method for independent party ratings according to claim 29, wherein said rating is from a scale comprising at least one from among a numerical rating scale and an alphanumeric rating scale.

31. The method for independent party ratings according to claim 29, wherein said context further comprises at least one from among a schedule of said at least one party to said call, a billing plan for said at least one party to said call, a subject of said call, and a content of said call.

32. A system for independent party ratings comprising:

an independent service accessible via a packet switching network communicatively connected via a secure gateway to a call enabled by a trusted telephone network; said independent service further comprising:

means for enabling an independent party to monitor a context of a call without participating in said call, wherein said context of said call comprises at least one identity of at least one party to said call with at least one identification of a device that performed a voice authentication of said identity;

means for identifying a rating for said call assigned by said independent party; and means for storing said rating by said independent party in association with said context in at least one context rating database from among a plurality of context rating databases each accessible to one of said independent service and a plurality of separate services accessible across said packet switching network, wherein said rating is retrievable by a subsequent party to at least one portion of said call.

33. The system for independent party ratings according to claim 32, wherein said rating is from a scale comprising at least one from among a numerical rating scale and an alphanumeric rating scale.

34. The system for independent party ratings according to claim 32, wherein said context comprises at least one from among a schedule of said at least one party to said call, a billing plan for said at least one party to said call, a subject of said call, and a content of said call.

35. A computer program product for independent party ratings comprising:

a recording medium;

means, recorded on said recording medium, for monitoring a context of a call by an independent party of said call, wherein said party monitors said context of said call from an independent service via a packet switching network communicatively connected via a secure gateway to said call supported within a trusted telephone network, wherein said context of said call comprises at least one identity of at least one party to said call with at least one identification of a device that performed a voice authentication of said identity;

means, recorded on said recording medium, for identifying a rating for said call assigned by said independent party; and means, recorded on said recording medium, for storing said rating by said independent party in association with said context in at least one context rating database from among a plurality of context rating databases each accessible to one of said independent service and a plurality of separate services accessible across said packet switching network, wherein said rating is retrievable by a subsequent party to at least one portion of said call.

* * * * *